United States Patent [19]

Roussey

[11] Patent Number: 4,467,217

[45] Date of Patent: Aug. 21, 1984

[54] HYDRO-TURBINE

[76] Inventor: Ernest H. Roussey, 5577 Grape St., San Diego, Calif. 92105

[21] Appl. No.: 379,076

[22] Filed: May 17, 1982

[51] Int. Cl.$^3$ .............................................. F03B 7/00
[52] U.S. Cl. ................................. 290/54; 416/223 R; 416/234
[58] Field of Search ....................... 416/197, 223, 234; 290/52, 43, 54

[56] References Cited

U.S. PATENT DOCUMENTS 1,522,437  1/1925  Gommer .............................. 416/197
2,335,106  11/1943  Carter ................................... 416/223

FOREIGN PATENT DOCUMENTS 1003074  9/1965  United Kingdom ........... 416/197 A

Primary Examiner—G. Z. Rubinson
Assistant Examiner—Shelley Wade
Attorney, Agent, or Firm—Charles C. Logan, II

[57] ABSTRACT

An improved hydro-turbine having a casing with an inlet port and an outlet port. A driveshaft is journaled in the casing and a rotor is secured to the driveshaft. The rotor has a cylindrical member whose radius is at least greater than 50 percent of the radius of the peripheral wall casing. A plurality of vane members extend outwardly from the outer radial surface of the cylindrical member. The vanes are spaced around the perimeter of the cylindrical member and each vane has a front surface and a rear surface. The front surface is substantially flat and the rear surface is convex in cross-section. The bottom edge of the rear of each vane is located substantially adjacent the bottom edge of the front surface of the adjacent vane member. The vane members extend substantially across the entire width of the cylindrical member.

4 Claims, 3 Drawing Figures

HYDRO-TURBINE

BACKGROUND OF THE INVENTION

The invention relates to a turbine and more specifically to a hydro-turbine to be used for generating electricity.

There is a great need to improve the output of electrical power at our hydro/electric power stations. In the past not as much attention was given to efficiency as there should have been given. Today we need more electrical energy because all the electricity being demanded.

A couple of examples of early turbine water wheels are illustrated in U.S. Pat. Nos. 324,113 and 1,047,898. The earliest of these two patents utilizes a turbine design wherein radial inlet flow of water and axial outlet flow are utilized to turn the turbine. The more recent of these two patents discloses the turbine provided with rotor plates having circumferential teeth adapted to receive direct impact of fluid, as well as the faces of the disc receiving the impact of the fluid to provide high starting torque and increased power at all speeds.

Although many years have passed since the invention of the two previously described turbine water wheels, the improvements have not been substantial in these later day models. Throughout these past decades, there has generally been more than enough water available to drive the turbine water wheels so that the conservation of the water was not of an immediate concern. Today the vast need for increased electrical power now requires a more efficient use of the water power that is available.

It is an object of the invention to provide a novel hydro-turbine that will greatly increase the amount of electricity that can be generated from a known amount of water power.

It is also an object of the invention to provide a novel hydro-turbine that is constructed with the vanes of the turbine having a long fulcrum length to give added torque power to the driveshaft.

It is another object of the invention to provide a novel hydro-turbine that has uniquely shaped vane members that make more efficient use of the water power available.

SUMMARY OF THE INVENTION

The novel hydro-turbine has been designed with a rotor mounted on the driveshaft and with the rotor having a cylindrical member whose radius is at least greater than 50 percent of the radius of the peripheral wall of the casing that surrounds the rotor. A plurality of vane members extend outwardly from the outer radial surface of the cylindrical member. The water that strikes the vane members for rotationally driving the rotor produces more torque on the driveshaft since the vane members have a longer lever action.

The vane members are spaced around the perimeter of the cylindrical member and they have a front surface and a rear surface. The front surface is substantially flat and the rear surface is convex in cross-section. The bottom edge of the rear surface of each vane is located substantially adjacent the bottom edge of the front surface of the adjacent vane member. Due to the structure of the vanes just described, less water is trapped between the adjacent vanes of the rotors when drivingly rotating the rotor. This increases savings in the amount of water required to drive each vane member translates out into the ability to produce a much greater amount of electrical power with the same known amount of available water power. A penstock can be connected to the inlet port of the hydro-turbine casing and this penstock would have a tapered diameter for increasing the speed of the water flow against the front surface of the vane members.

DESCRIPTION OF THE PREFERRED EMBODIMENT

Figure 1:
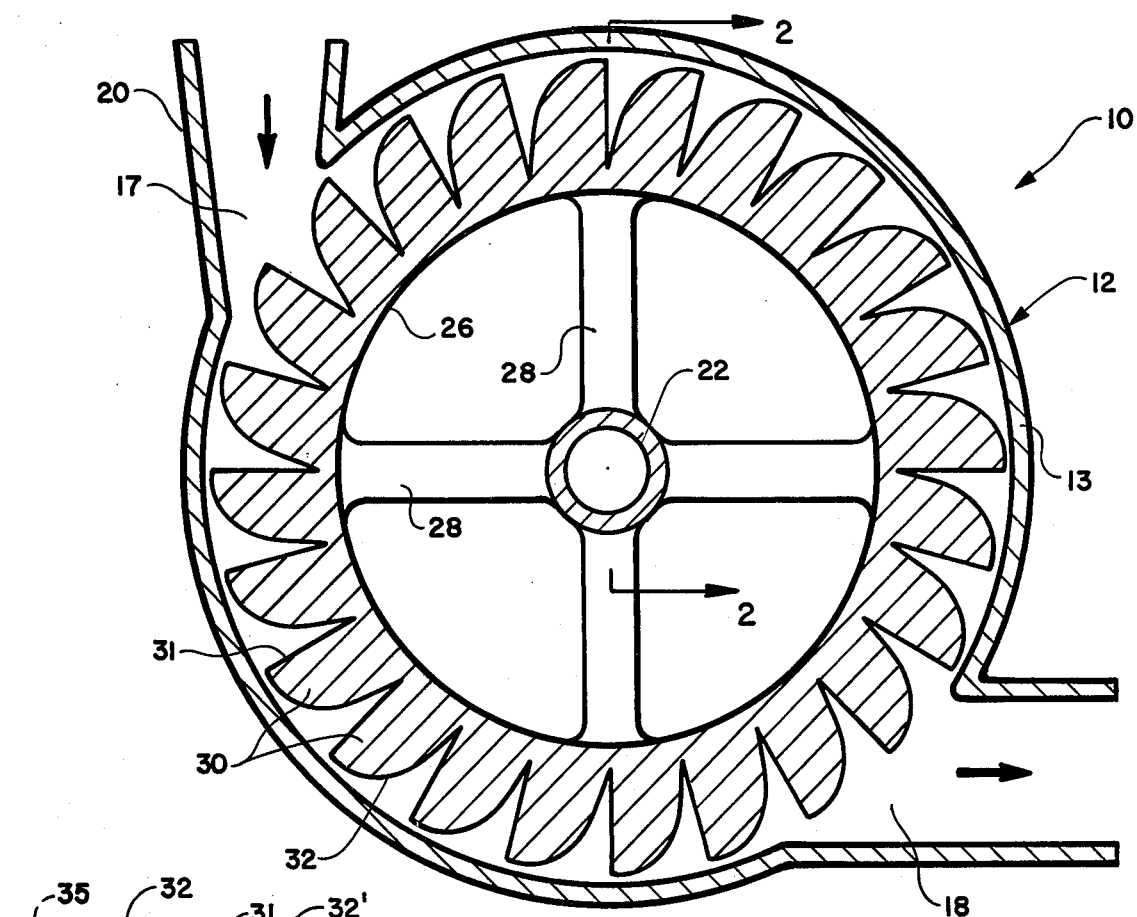
FIG. 1 is a vertical cross-sectional view of the novel hydro-turbine.
Figure 2:
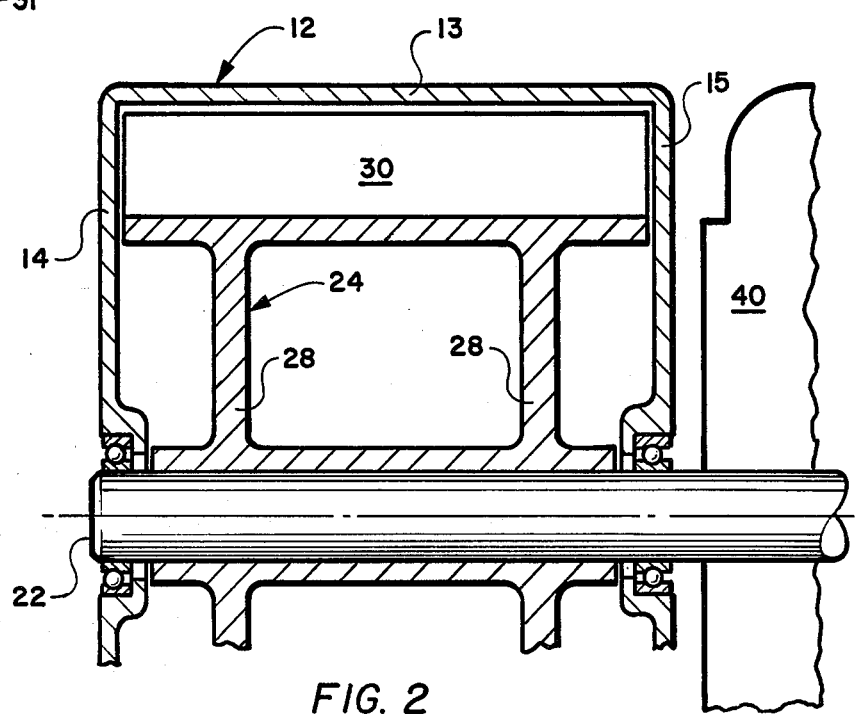
FIG. 2 is a cross-sectional view taken along lines 2—2 FIG. 1.

Applicant's novel hydro-turbine will be described by referring to FIGS. 1-3. The hydro-turbine is generally designated numeral 10.

Hydro-turbine 10 has a cylindrical casing 12 having an outer wall surface 13 and end wall surfaces 14 and 15 respectively. Casing 10 also has an inlet port 17 and an outlet port 18. A penstock 20 is connected to inlet port 17 for supplying the water which drives the hydro-turbine.

A driveshaft 22 is journaled in the sidewalls 14 and 15 of casing 12. A rotor 24 is secured to driveshaft 22. Rotor 24 has a cylindrical member 26 whose radius is at least greater than 50 percent of the radius of the peripheral wall of the casing 12. Spokes 28 connect the driveshaft 22 to the inner surface of cylindrical member 26.

A plurality of vane members 30 extend outwardly from the outer radial surface of cylindrical member 26. These vanes 30 are spaced around the perimeter of cylindrical member 26 and each vane has a front surface 31 and a rear surface 32. Front surface 31 is substantially flat and rear surface 32 is convex in cross-section. Vane members 30 extend substantially across the entire width of cylindrical member 26. An electricity generator 40 is driven by driveshaft 22.

Figure 3:
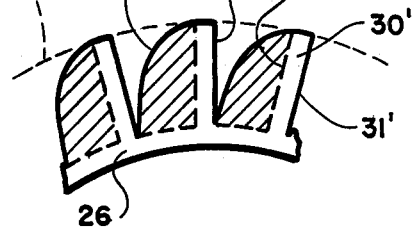
FIG. 3 is a schematic view of the novel vane members illustrating how they reduce the amount of water trapped between adjacent vane members.

In FIG. 3 is shown a schematic view of the novel vane members illustrating how they reduce the amount of water trapped between adjacent vane members. Prior art rotors had radial vanes 31 having a substantially flat front surface 31 and a substantially flat rear surface 32. These adjacent vanes 30 defined an area between themselves and the outer surface of cylinder member 26 and perimeter line 35 in which water would be trapped. The convex rear surface 32 reduces by over 50 percent the amount of water that can be trapped between the adjacent vane members 30. As can be noted in FIGS. 1 and 3 of the drawings, the cross-section of the respective vanes show that the vanes with their convex rear surface fill at least 60 percent of the area between the respective vanes.

What is claimed is:
1. A hydro-turbine comprising:
   a casing having an inlet port and an outlet port;
   a drive shaft journaled in said casing;
   a rotor secured to said drive shaft, said rotor being formed from a cylindrical member whose inner radius is at least greater than 50 percent of the outer radius of said rotor, a plurality of spokes extending inwardly from the inner radius surface of said cy- lindrical member, the inner ends of said spokes being structurally secured to said drive shaft so that said rotor and said drive shaft rotate as a single unit; and a plurality of vane members extending outwardly from the outer radial surface of cylindrical member, said vanes being spaced around the perimeter of said cylindrical member, said vanes having a front surface and a rear surface, said front surface being substantially flat and said rear surface being convex in cross-section, the bottom edge of the rear surface of each vane is located substantially adjacent the bottom edge of the front surface of the adjacent vane member whereby the area defined from the front flat surface of one vane to the flat front surface of the next adjacent vane and also the area defined between the outer radius of the vanes and the inner radius of the respective vanes is at least 60 percent filled by the material of said respective vanes thus reducing the amount of space in which water would be trapped between adjacent vanes and thereby reducing the amount of water required to operate the turbine.

2. A hydro-turbine as recited in claim 1, wherein said vane members extend substantially across the entire width of said cylindrical member.

3. A hydro-turbine as recited in claim 1 further comprising a penstock connected to said inlet port.

4. A hydro-turbine as recited in claim 3 wherein said penstock is connected to said inlet port at an angle which allows the flow therefrom to be directed against the front surface of said vane members.

* * * * *